United States Patent [19]

Green

[11] Patent Number: 4,921,416
[45] Date of Patent: May 1, 1990

[54] INJECTION MOLDING MACHINE HAVING A SYSTEM FOR DETECTING A NOZZLE LEAK CONSTRUCTION

[76] Inventor: Thomas M. Green, 9153 Lincoln Lake Rd., NE. Greenville, Mich. 48838

[21] Appl. No.: 389,330
[22] Filed: Aug. 3, 1989
[51] Int. Cl.⁵ .............................................. B29C 45/78
[52] U.S. Cl. ................................. 425/143; 425/170; 425/542; 264/406
[58] Field of Search ................ 264/40.6; 425/143, 144, 425/169, 170, 542

[56] References Cited

U.S. PATENT DOCUMENTS 2,551,439  5/1951  Kovacs .................................. 425/143
3,733,059  5/1973  Pettit ..................................... 425/143

Primary Examiner—James C. Housel
Assistant Examiner—Timothy W. Heitbrink
Attorney, Agent, or Firm—Donald J. Breh

[57] ABSTRACT

An injection molding machine having a system for detecting nozzle leaks including a thermocouple positioned in the tunnel opening of a stationary platen of the machine at a predetermined location relative to the nozzle to sense instantaneous temperature at the location. A controller coupled to the thermocouple receives signals from the thermocouple and activates an alarm when the temperature in the tunnel opening falls outside of a predetermined normal operating temperature range.

10 Claims, 2 Drawing Sheets

1

INJECTION MOLDING MACHINE HAVING A SYSTEM FOR DETECTING A NOZZLE LEAK CONSTRUCTION

BACKGROUND OF THE INVENTION

This invention relates to injection molding machines and in particular to an improvement in injection molding machines of the type having a nozzle mounted to inject a pressurized molten plastic into a mold cavity through a sprue and associated runner system. Typically, such injection molding machines employ a stationery platen mounted to one mold half with an opening into the platen at the sprue of the mold. The tip or outlet end portion of the nozzle is mounted against a sprue bushing such that the molten plastic will be injected into the sprue. Although the nozzle to sprue bushing interface in these machines is designed to be a sealed interface to prevent leakage of the molten plastic from between the nozzle and sprue bushing, it is a known reocurring problem that such leakage does take place with resultant problems including, among others, delivery of an inadequate supply of plastic into the mold, loss of proper pressure, material waste, damage to sensitive controls and parts of the machine due to for example the high temperatures of the leaking molten plastic material and consequential machine down time for repairs and high finished part scrap. Nozzle leaks, although principally occuring at the interface of the nozzle tip and sprue bushing, are known to occur at other locations associated with the nozzle such as for example at the nozzle attachment point to the machine's barrel which delivers the molten plastic to the nozzle. Depending on where the nozzle leak occurs and the rate of leakage, the leaking molten plastic can flow over different courses or paths. For example, in one type of leak, the molten plastic mushrooms or billows out from between the nozzle tip and sprue bushing interface due to a poor seal into the air space surrounding the nozzle in the platen opening. Other leaks are of a slow glittering type which actually clings to and creeps down the length of the nozzle eventually encrusting the nozzle or reaching the sensitive areas associated with the machine's operations.

It would therefore be highly desirable to provide for means to detect leaks associated with the nozzle of such machines so that corrective measures can be initiated before damage to expensive parts of the molding machine or excess scraped parts is encountered.

SUMMARY OF THE INVENTION

I have found that in general, regardless of the type of leak, that is in terms of rate of leakage or where the leak associated with the nozzle initiates and how it propagates, the temperature of the airspace in the platen tunnel opening surrounding the nozzle in injection molding machines of this type is effected and can be utilized as an indication of a leak condition associated with the nozzle.

In accordance with a preferred embodiment of the invention, means for sensing the instantaneous temperature at a predetermined location within the air space surrounding the nozzle in the opening in the stationary platen of an injection molding machine is provided, where the predetermined location has a known normal operating temperature range and the means for sensing the instantaneous temperature generates signals which are coupled to control means for activating an alarm when a predetermined temperature exceeding the normal operating temperature range and representing a leak condition is detected.

According to the invention, the means for sensing the instantaneous temperature is a thermocouple disposed at the predetermined location in the air space.

According to one feature of the invention, the predetermined temperature representing a leak condition is above the normal operating temperature range and according to another feature, the predetermined temperature representing a leak condition is below the normal operating temperature range.

A further important feature of the invention provides for the thermocouple to be disposed in the airspace below the horizontally disposed nozzle.

A still further important feature of the invention provides for the predetermined location to be disposed in the air space surrounding the nozzle relative to the interface of the nozzle and the sprue bushing of the machine.

BRIEF DESCRIPTION OF THE INVENTION

The invention will be better understood after reading the following Detailed Description of the Preferred Embodiment in conjunction with the Drawing of which:

DETAILED DESCRIPTION OF THE PREFERRED EMBODIMENT

Figure 1:
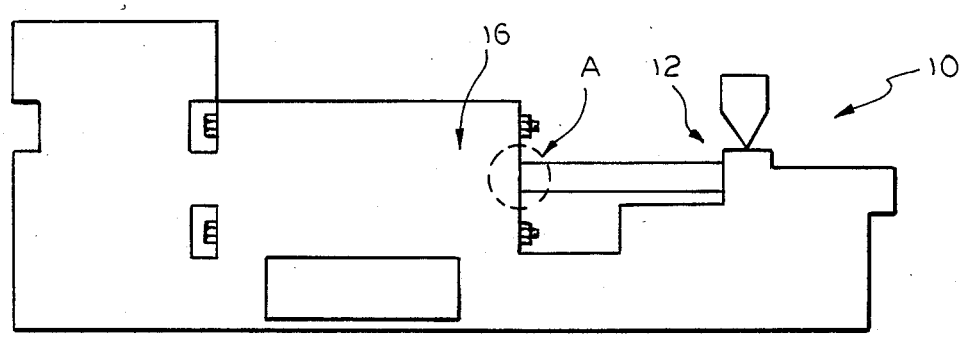
FIG. 1 is a side view in outline form of a typical horizontal injection molding machine of the general type to which the present invention is applicable.
Figure 3:
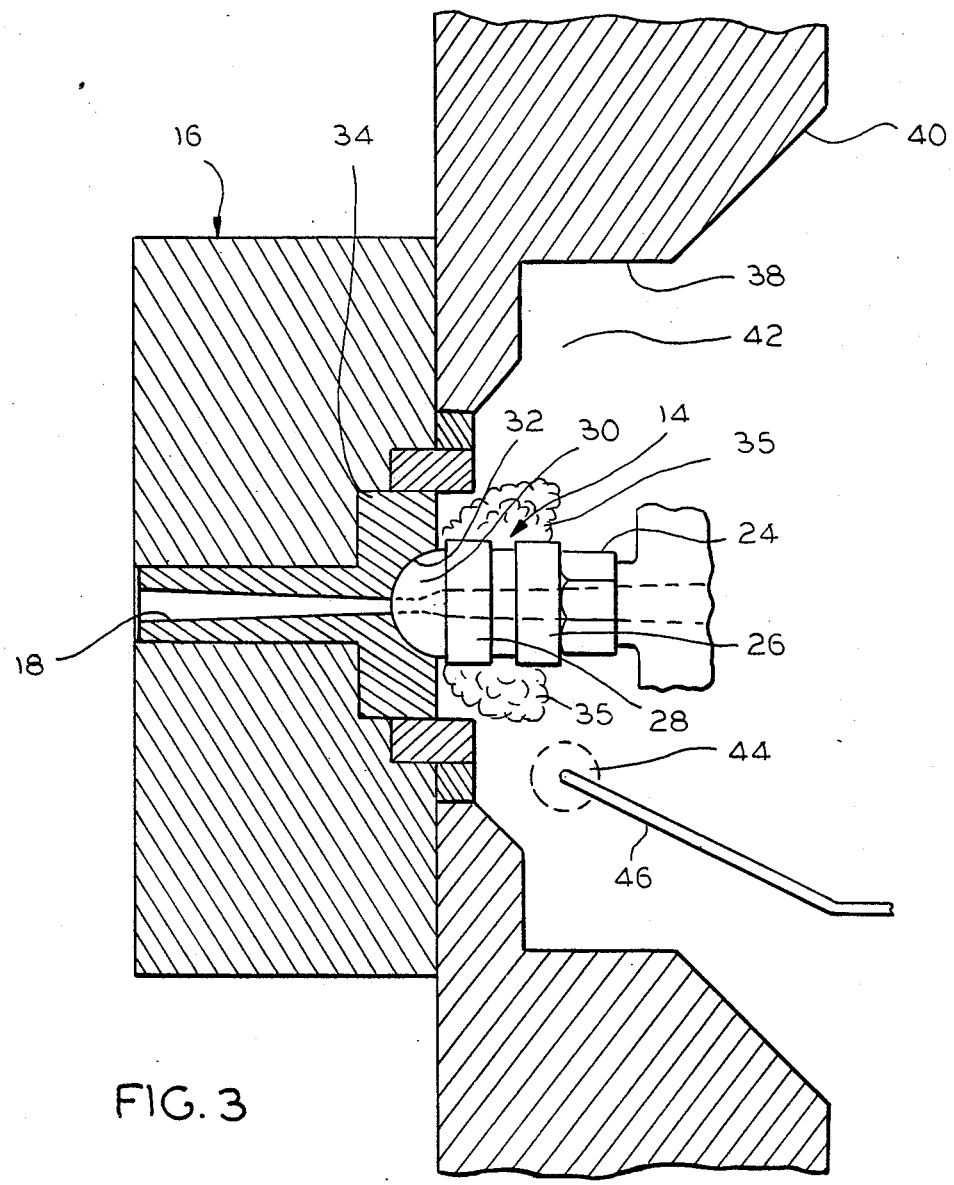
FIG. 3 is a further enlarged cross sectional view of the nozzle area in FIG. 2 showing further details of construction.

Shown in FIG. 1 is a horizontal type injection molding machine 10 to which the present invention is applicable. Although the detection system described hereinbelow is described in use with a horizontal type injection molding machine, so called vertical machines also exist and the invention is also applicable for use with such machines. The details of the construction and operation of the injection molding machine 10 are well known and need not be described in full detail for an understanding of the present invention. In general, the injection molding machine 10 includes means shown generally as 12 in FIGS. 1 and 2 for delivering a pressurized molten plastic to a nozzle 14, shown in FIGS. 2 and 3, for injection into a mold cavity within a mold 16 through a sprue 18 and associated runner system, not shown in detail, in conventional and well known manner. Typically, the means for delivering the molten plastic includes, for example, a barrel 20 and associated heaters 22 and other controls for maintaining the molten state of the plastic and to which the nozzle 14 is mounted typically by way of an associated nozzle adapter 24. Typically, the nozzle 14 will carry further nozzle heaters such as 26, 28 and thermocouples. The nozzle outlet end 30 is sealedly seated against a mating nozzle seat 32 surrounding the sprue 18 in a sprue bushing 34 provided in one mold half 36, as shown in FIG. 3. The interface between the nozzle outlet end 30 and the seat 32 on the spure bushing preferrably is designed to provide for a leak free seal so that molten plastic will not escape, as shown as 35 in FIG. 3. However, as noted hereinabove, for many varied reasons, it is known that over time leaks can develop at this interface allowing the molten plastic 35 to escape. In the typical injection molding machine, the nozzle 14 passes through a tunnel opening 38 provided in a stationary platen 40 which is mounted to one side of the mold between the mold 16 and the machine barrel 20. The tunnel opening 38 in the platen can take different shapes but is typically coaxial with the sprue 18 and nozzle 14 and defines an annular clearance space or air space 42 around the nozzle. In operation, the normal operating temperature range of any location within the air space 42 can be determined and remains substantially within a known range for a given operating mode. That is, when the machine is set up to melt, pressurize and deliver a given plastic material into a given mold, the temperature characteristics at a predetermined location, for example location 44, within the air space 42 of the tunnel opening 38 relative to the nozzle and or to the nozzle to sprue bushing interface becomes known. Accordingly, when the temperature at the predetermined location 44 rises above the highest predetermined operating temperature for the particular setup, there is an indication that the hotter molten plastic has entered the air space due to a leak associated with the nozzle or its mounting. As will be described below, should the temperature at the predetermined location 44 fall below the lowest normal operating temperature for the particular mode of operation, there accordingly is an indication of a leak condition and further of a specific type of a leak.

Figure 2:
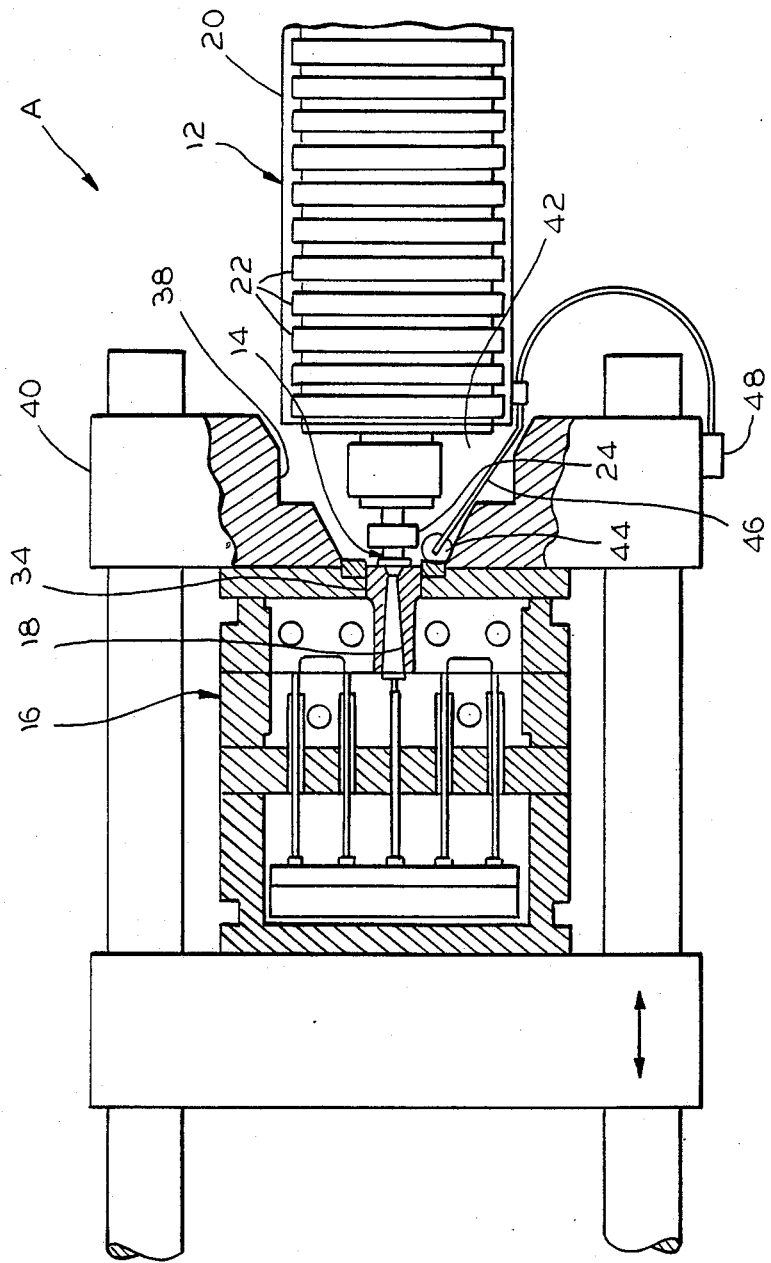
FIG. 2 is an enlarged partial cross-sectional view of the circled area A of the machine in FIG. 1 showing details of construction of a preferred embodiment of the invention.

According to the invention, a thermocouple 46, preferrably of the type having a bendable shielded covering, is mounted, for example, externally of the platen tunnel opening, such as to any convenient location on the machine housing or barrel, as shown in FIG. 2, and has it's heat sensitive tip positioned at the predetermined location 44. The thermocouple thereby senses and generates signals representing the instantaneous temperature at the predetermined location 44. An electronic controller 48 is coupled to the thermocouple 46 and receives the instantaneous temperature signals. The controller 48 is adapted to give either a visual or audible alarm when a temperature either above or below the normal operating temperature range is sensed, thus notifying the operator of a leak condition. Those skilled in the art having the benefit of the objects and description of the invention can readily devise appropriate controls and alarm devices for coupling and responding to the thermocouple signals in the manner described and a complete detailed description of specific circuitry for doing so is not necessary here.

As noted above, different types of leaks occur in these machines and the invention can respond to and differentiate between at least two different types of leaks. In use, the operator would adjust the controller 48 to activate the alarm when temperatures at the predetermined location outside of a known predetermined normal operating temperature range are sensed depending on the particular mode of operation of the molding machine. Once in operation, should a mushrooming type leak occur at the nozzle to sprue bushing interface, as represented as 35 in FIG. 3, or at a mounting of the nozzle to the barrel, such as at the mounting adapter 24, high temperature molten plastic 35 will escape into the air space 42 causing a rise in the temperature in the air space at the location 44 which is sensed by the thermocouple 46 and controller 48 to sound the alarm. Should the leak be of the type that can be referred to as a "slithering" or "creeping" type leak, the molten plastic escapes relatively slowly from between the nozzle to sprue bushing interface and clings to the nozzle and resolidifies on the nozzle which acts as a heat sink. In such case, the plastic material slowly works its way back along the nozzle until, if unchecked, it may reach the sensitive heaters and other controls associated with the nozzle and barrel of the machine. As the molten plastic creeps back and resolidifies along the nozzle, it begins to form a crust on the nozzle which acts as a heat barrier between the heaters associated with the nozzle and barrel and the air space, whereby the temperature in the air space, for example at location 44, will actually decrease. This decrease in temperature is sensed by the thermocouple 46 and, when it falls below the known normal operating temperature range for the particular mode of operation, the controller activates the alarm, thereby alerting the operator to the leak condition before the plastic material reaches and damages the more sensitive parts of the machine as noted above. Further, because the leak condition was detected by a temperature below the normal operating temperature range, the operator is alerted to the possibility that the leak is of a slow, creeping or slithering type encrusting the nozzle.

Having described the preferred embodiment of the invention, those skilled in the art having the benefit of the description and accompanying drawings can readily devise other embodiments and modifications of the invention and such other embodiments and modifications are to be considered to be within the scope of the appended claims.

What is claimed is:

1. An injection molding machine, comprising in combination:
    a mold including a sprue;
    a platen mounted to said mold, said platen including an opening generally coaxial with said sprue;
    a nozzle mounted in said opening of said platen with an annular clearance space around at least a portion of the nozzle proximate an end thereof, said nozzle including an outlet disposed coaxial with said sprue from which a molten plastic is discharged into said sprue;
    means for delivering a molten plastic to said nozzle;
    means for detecting a leak condition including thermocouple means disposed in said clearance space at a predetermined location for generating signals representing an instantaneous temperature at said predetermined location, and
    control means coupled to said thermocouple means for receiving said signals and for actuating an alarm when said signals correspond to a predetermined temperature corresponding to a leak condition.

2. The injection molding machine as defined in claim 1 wherein said control means activates said alarm means at a signal from said thermocouple means representing a temperature at said predetermined location in said clearance space above a predetermined normal operating temperature.

3. The injection molding machine as defined in claim 1 wherein said control means activates said alarm means at a signal from said thermocouple means representing a temperature at said predetermined location in said clearance space below a predetermined normal operating temperature.

4. The injection molding machine as defined in claim 1 wherein said predetermined location is proximate an interface between said nozzle and a sprue bushing of said mold.

5. The injection molding machine as defined in claim 4 wherein said nozzle is disposed in a horizontal orientation and said thermocouple predetermined locations is disposed below said nozzle in said clearance space.

6. An injection molding machine, comprising in combination:
   a mold having at least one sprue bushing, said sprue bushing having a sprue;
   at least one nozzle positioned against said sprue bushing said nozzle having an outlet coaxial with said sprue for injecting a molten plastic into said sprue;
   a stationary platen mounted to said mold, said stationary platen including an opening, said nozzle disposed in said opening with an annular air space between said nozzle and said stationary platen, a predetermined location in said annular air space having a normal operating temperature range;
   means for delivering said molten plastic to said nozzle;
   means for detecting a leak condition including means disposed at said predetermined location in said air space relative to said nozzle for sensing an instantaneous temperature at said predetermined location, and
   means responsive to said means for sensing the instantaneous temperature for activating an alarm at at least one predetermined sensed instantaneous temperature outside of said normal operating temperature range.

7. The injection molding machine as defined in claim 6 wherein said means for sensing the instantaneous temperature is a thermocouple.

8. The injection molding machine as defined in claim 7 wherein said means for activating the alarm is adapted to activate the alarm at a predetermined instantaneous temperature above said normal operating temperature range.

9. The injection molding machine as defined in claim 7 wherein said means for activating the alarm is adapted to activate the alarm at a predetermined instantaneous temperature below said normal operating temperature range.

10. An injection molding machine, comprising in combination;
   a mold having a sprue;
   a stationary platen mounted to said mold, said platen having a tunnel opening generally coaxial with said sprue;
   a nozzle mounted in said tunnel opening with an annular air space in said tunnel opening between said nozzle and a wall of said tunnel opening;
   means for delivering a molten plastic to said nozzle;
   a thermocouple disposed at a predetermined location in said air space, and
   means coupled to said thermocouple for activating an alarm at a predetermined temperature.

* * * * *